United States Patent [19]

Kawakita et al.

[11] Patent Number: 4,689,919

[45] Date of Patent: Sep. 1, 1987

[54] METHOD FOR WELDING CUTTER SEGMENTS

[75] Inventors: Takao Kawakita, Ikeda; Ichiro Miyao, Fujieda, both of Japan

[73] Assignee: Osaka Diamond Industrial Co., Sakai, Japan

[21] Appl. No.: 726,517

[22] Filed: Apr. 24, 1985

[30] Foreign Application Priority Data

May 8, 1984 [JP] Japan ................... 59-92518
May 8, 1984 [JP] Japan ................. 59-67635[U]

[51] Int. Cl.⁴ ............................................. B24D 5/06
[52] U.S. Cl. ................................... 51/206 P; 51/207; 219/121 LC
[58] Field of Search ............... 76/112, 101 A, 101 R, 76/DIG. 11, DIG. 12; 51/206 R, 206.4, 206.7; 219/121 LC, 121 LD

[56] References Cited

U.S. PATENT DOCUMENTS

| | | | |
|---|---|---|---|
| 2,683,923 | 7/1954 | Replogle | 76/112 |
| 3,069,816 | 12/1962 | Pratt et al. | 51/206 R |
| 3,110,579 | 11/1963 | Benson et al. | 76/112 |
| 3,203,774 | 8/1965 | Pratt | 51/206 R |
| 3,590,535 | 7/1971 | Benson et al. | 51/206.4 |
| 4,462,293 | 7/1984 | Gunzner | 76/112 |

OTHER PUBLICATIONS

Marks' Standard Handbook for Mechanical Engineers, pp. 13–47, 13–48.

*Primary Examiner*—Frederick R. Schmidt
*Assistant Examiner*—Maurina Rachuba
*Attorney, Agent, or Firm*—Staas & Halsey

[57] ABSTRACT

Method for welding cutter-segments characterized by focusing an electron beam or a laser beam on the boundary between a carbon-steel core body (7) and segments (1). Each segment is formed by a Co (cobalt) powder compact, containing diamond or CBN grit, which has been sintered to nearly 100% apparent density. The boundary may or may not have Ni (nickel)-filler. In cases of bond materials other than Co, the segment (1) has a structure of double layers (4, 5), one layer of which is composed of a powder compact, containing diamond or CBN grit, which has been sintered to nearly 100% apparent density, and the other layer (5) of which is composed of a sintered Co powder compact without any grit. The carbon-steel core body (7) welded by the above-mentioned method is thereafter tempered at 350°–450° C. if necessary. A steel core having no slot at its periphery may be used as the core body.

17 Claims, 7 Drawing Figures

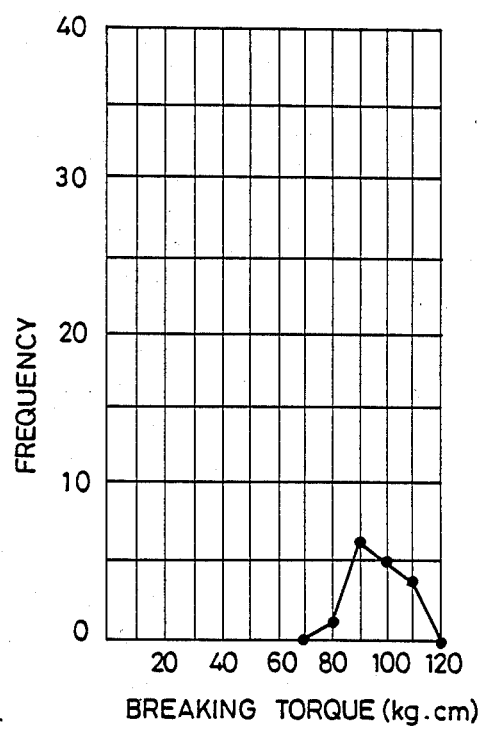

METHOD FOR WELDING CUTTER SEGMENTS

BACKGROUND OF THE INVENTION

The present invention relates to a method for producing a cutter, and more particularly to a method for welding cutter segments composed of sintered compacts, which comprise diamond or CBN (cubic boron nitride) grit, to a core body.

FIG. 1 shows a conventional method of fixing cutter-segments that contain diamonds onto a core body. A circular blade as shown is mounted on a motor-driven shaft (not shown) by, for example, use of a center hole 2a and is used as a handy cutter, for such operations as (1) cutting bricks, slates and tiles, (2) trimming stone blocks, (3) cutting iron sheets, concrete pipes and concrete blocks, (4) grooving concrete roads, (5) forming curved surfaces on stone blocks, (6) chamfering stone blocks and (7) beveling stone blocks.

In FIG. 1, the numeral 2 denotes a steel core, and the numeral 1 is a cutter segment made of a mixture of bond powder, such as Co (cobalt), and diamond or CBN grit, which has been compacted and sintered (in most cases, by hot pressing) to nearly 100% apparent density. Such segments are fixed onto the core 2 by brazing to make a cutter blade.

The multi-segment circular cutter made by the above conventional process has defects and problems as described below:

(a) When this kind of brazed blade is used under such severe conditions, such as cutting without a lubricant like water (dry condition) along with uneven loading on segments, a concentration of heat at a specific segment can be observed. The heat concentration results in the softening of the solder and consequently tends to result in accidents from detachment of the segment.

(b) In the case of the brazing process, a high-frequency electric device or gas burner used as a means of heating will heat not only the brazing boundary but also a large area of the adjacent core 2, causing a metallographic structural change there which induces distortion of the core. This problem, which, in general, is common to the brazing of multi-segment tools made of a circular iron core, becomes particularly serious in the case of small diameter cores such as those for handy or wagon-type portable diamond cutters, because the ratio of heat-affected zone to the total area of the core is fairly large and the ratio of thickness to the diameter of the core is fairly small. In order to prevent this distortion, slots 3 as shown in FIG. 1 are provided to release the local strain and to prevent heat conduction from one segment to the next during the brazing process. It is a commonly-held view of the diamond blade industry that the core for the above-mentioned portable diamond cutter should by all means be provided with slots. These slots, however, result in the disadvantage of weakness of the core design against static or dynamic loads on the core.

(c) Heating during the brazing process induces the phenomenon of annealing of the material in a large area of the core 2, which causes degeneration of the resistance of the core against bending stress.

With regard to FIG. 2, generally speaking, in all cases of the welding process or the brazing process, the necessary condition for achieving high joining strength is to avoid weakening the structure at any heat-affected zone Y of the segment, metallic joining layer like solder X or heat-affected zone Z of the core.

Above-mentioned explanation (a) relates to layer X, and explanation (c) relates to layer Z. Problems (a) and (c) are inherent to the brazing process and problem (b) is inevitable in the case of a high-frequency heating process.

SUMMARY OF THE INVENTION

It is, accordingly, an object of the present invention to overcome the practical disadvantages in the conventional methods of fixing segments onto the core as described above.

This invention relates to a method of welding by focusing an electron beam or a laser beam, which is a high energy source which can be concentrated on a small, limited area to cause instantaneous and simultaneous melting and solidification, on the boundary of the core and segments.

According to this invention, the welding process allows all core metals and segment bond materials to be molten and makes a perfect molten layer alloy (strengthening of X-layer). It does not employ any metal of low melting point and thus does not cause any softening at elevated temperatures, which is always the case when brazing with solder. The joining strength is, therefore, high enough and there is no danger of parting of the segment even in dry cutting use.

According to a preferred embodiment of the invention, Co bond powder sintered to nearly 100% apparent density having a dispersoid of diamond or CBN grit is used as the material of the segments. The Co powder compact does not show significant change in its metallographic structure even when it is heated up to the melting point of Co (a problem of the Y-layer) and thus no fragile layer is formed in the portion adjacent to the welded layer. When an iron core is used, Co and Fe are easily alloyed and there is no fear of forming a fragile structure judging from the phase diagram of the alloy (a problem of the X-layer). If the core material is low carbon-steel, there is in general no danger of forming a fragile quenched structure in the portion adjacent to the welded layer (a problem of the Z-layer).

If tool steel, such as SK-5 in JIS, is used as a core material for the purpose of increasing the strength of the core, the addition of Ni (nickel) to the alloy system Fe (iron)-Co-C (carbon) decreases the hardenability of the alloy at the welded layer (X-layer). Systems Ni-Co and Ni-Fe are easily alloyed and excellent welding results.

At the portion adjacent to the welded layer (Z-layer), a quenched structure is formed by rapid cooling. This quenched structure turns to a ductile structure when it is tempered at 350°–450° C. and the stress induced from quenching is released by tempering. Thus a cutter having a strong resistance against bending can be attained.

When a double layer segment, one layer of which is composed of a powder compact, containing diamond or CBN grit, and the other layer of which is composed of sintered Co powder compact without any grit, is applied to this invention, only the Co powder compact layer is related to welding, and thus the layer containing diamond or CBN grit is isolated from the welding process. Therefore, there are many possibilities for the choice of the bond material containing diamond or CBN grit.

Further, an electron beam or a laser beam can perform a weld in which heat is concentrated on a limited area in a short time. Accordingly, distortion of the core, which is inherent to the process of heating a vast area, as is the case with the conventional brazing process, is not observed at all. Thus a core of strong shape without any slot can be used, allowing us to attain a cutter which may be hardly deformed at all by external force.

BRIEF DESCRIPTION OF THE DRAWINGS

FIG. 7 shows the result of a breaking test on the specimens whose constituents, pure Co bond segments, Ni-filler and tool steel (SK-5) core were welded by an electron-beam and thereafter tempered at 500° C. for 20 minutes.

DETAILED DESCRIPTION OF THE INVENTION

The method of welding of this invention as well as the conventional brazing method is explained below.

In the experiments for this invention, an electron beam was mainly used as the means of welding. It had been confirmed, however, in a preliminary experiment, that welding of a small test piece of Fe to a sintered Co powder compact using a YAG laser beam was very similar to the welding with an electron beam.

The specifications of electron beam welding of this invention are: 150 kV (Voltage), 2.5 mA (Beam current), 1 mm (Width of beam scanning) and $10^{-4}$ mmHg (Vacuum). The electron beam was focused on a 1 mm-wide band encompassing the boundary line between the core and segments, with or without filler and solder, in such a way that the path of the electron beam melts and solidifies all metallic materials existing in the band instantaneously.

The dimensions and shape of the core are: 92 mm outer diameter, 20 mm inner diameter, and 1.5 mm thickness. Eight slots of 3 mm width are grooved on the core. The core material is SPCC (mild steel), S50C (carbon steel) or SK-5 (tool steel) in JIS.

The dimensions and shape of the segments are: 32 mm length, 2 mm thickness and 46 mm radius arc. The segment material is (1) sintered pure Co powder containing diamond grit or (2) double layer composite of sintered (Co+Cu) powder containing diamond grit and sintered Co powder without diamonds.

0.2 mm-thick Ni sheet was used as filler. Sil 103 and Sil 1023 made by NAISU Co. were used as solder.

To evaluate the strength of welding, the core was fixed and segments were broken by bending with a torque wrench and the torque required to break the segments was measured.

Datum 1 (Conventional method)

Figure 3:
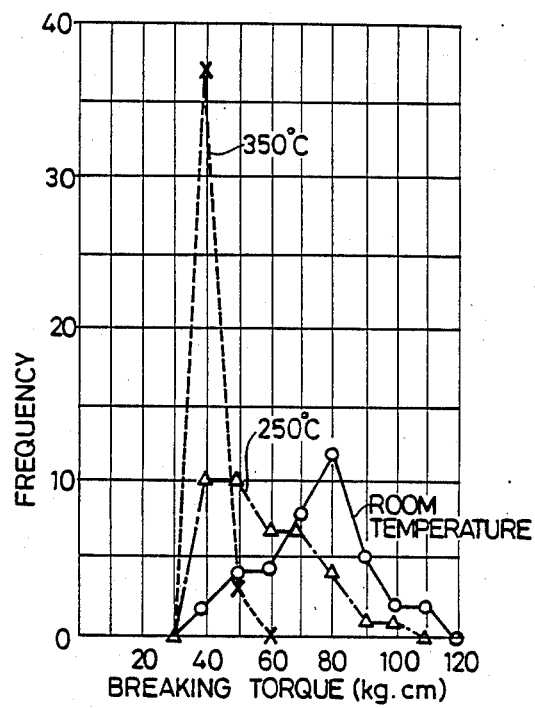
FIG. 3 shows how brazing strength is affected by the temperature of a cutter for the case of a brazed cutter.

As is shown in FIG. 3, segments brazed with Sil 103 solder by a conventional process show strength of 40-110 kg.cm at room temperature, but the strength goes down with the temperature rise up to 250°-350° C. because of softening of the solder. At 350° C. the strength goes down to less than 60 kg.cm for all segments.

The melting point of Sil 103 is 620° C., and the chemical composition is: Ag 45.3%, Cu 15.6%, Cd 23.8% and Zn bal.

Datum 2

Segments made of pure Co bond and a core made of SPCC were welded by an electron beam. None of the welded areas were broken at 60 kg.cm torque, but the adjacent portions of the core were bent by the 60 kg.cm torque. This shows the welding strength is larger than the strength of the core material.

Datum 3

Segments made of pure Co bond and a core made of SPCC, with Ni-filler between segments and the core, were welded by an electron beam. All the portions adjacent to the welded areas bent at 60 kg.cm torque, showing perfect welding strength.

Datum 4

Segments of pure Co bond, Ni-filler and a core made of SK-5 were welded by an electron beam, and the welded body was tempered under various conditions of temperature and time as shown below. Four segments were broken to measure each torque strength (kg.cm) at room temperature. The results are as follows:

| | | | | |
|---|---|---|---|---|
| No tempering | 100* | 170 | 90* | 80* |
| Tempering at 280° C. for 20 min. | 110 | 180 | 90* | 140 |
| Tempering at 350° C. for 20 min. | 140 | 150 | 140 | 130 |
| Tempering at 400° C. for 20 min. | 160 | 160 | 160 | 150 |
| Tempering at 450° C. for 20 min. | 160 | 140 | 140 | 130 |
| Tempering at 500° C. for 20 min. | 120 | 130 | 100 | 130 |

(Note)
*means breakage at core material (Z—layer)

Furthermore, segments made of pure Co bond, Ni-filler and a core made of SK-5 were welded by an electron beam and the welded body was tempered at 500° C. for 20 minutes. Welding strength was measured at 350° C. on 16 segments which had undergone the above-mentioned treatment. The results are shown in FIG. 7.

As is seen in the above-mentioned data, the segments tempered at 500° C. for 20 minutes showed strengths of 120, 130, 100 and 130 kg.cm at room temperature, whereas FIG. 7 shows that the segments welded by an electron beam showed little decrease in strength at 350° C. If we compare this fact to Datum 1 concerning Sil 103 solder, the outstanding difference between the two processes becomes clear.

From the above-mentioned results, it can be seen that the tempering process, preferably at 350°-450° C., is effective in eliminating brittleness of the heat-affected zone of the core (layer Z) and in increasing the strength of such easy-to-quench carbon-steel like SK-5 welded with the use of Ni-filler by an electron beam.

Datum 5

Segments made of pure Co bond and a core made of SK-5 welded by an electron beam showed lower strength than those with Ni-filler. All segments could be broken under a torque of 70 kg.cm at the core material (layer Z).

Datum 6

In the case of a combination of pure Co bond segment and an SK-5 core with fillers other than Ni, the welding strength is lower than the one described in Datum 4.

|  | Welding strength | | | |
|---|---|---|---|---|
| Sil 1023 solder* | 80 | 70 | 80 | 80 |
| Cu | 60 | 60 | 60 | 60 |

(Note)
*Sil 1023: Melting point 730, Chemical composition Ag: 40.2%, Cu: 30.6%, Zn: 29.2%

Datum 7

When an SK-5 plate is exposed to an electron beam and becomes molten in a limited zone, a metamorphic zone is formed.

Figure 4:
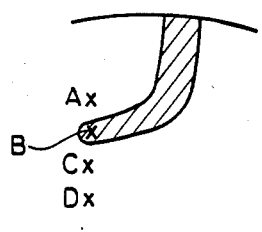
FIG. 4 is a magnified drawing of a melting trace on a core of tool steel (SK-5) made by an electron beam.

FIG. 4 shows the magnified trace of a molten zone produced by the electron beam. The hatched area B is the molten zone. A and C show points neighboring the molten zone. D shows a distant point. The Micro-Vickers hardness was measured at these four points. The results are as follows:

A: 332, B: 603, C: 358, D: 325

This shows that the fragile hardened layer is formed by the local quenching at the molten zone.

Datum 8

With the combination of a pure Co bond segment, Ni-filler and SK-5 core, a homogeneous Ni-Co-Fe alloy is formed by electron beam welding.

The distribution of Fe, Ni and Co of a cross-section of a portion which was electron-beam welded from one side and then from the opposite side was observed with an X-ray microanalyser. It was found that a perfect Ni-Co-Fe alloy had been formed in the welded portion.

Datum 9

In the case of the combination of a double layer segment, having 15% Cu-85% Co and 100% Co layers, 100% Ni sheet filler and SPCC core, an electron beam was focused (1) on the boundary between Ni and Co and (2) on the boundary between Ni and SPCC. The thickness of the Ni-filler was 0.2 mm, as was described above. Even in the case of (1), a portion of SPCC became molten.

Strength tests were made on the above-mentioned two kinds of samples. The samples made by (1) all broke at 60 kg.cm, whereas the samples made by (2) did not break but, rather, bent at 60 kg.cm torque.

In the case of (1), welding heat affects 15% Cu-85% Co sintered powder compact more severely than in the case of (2), and thus, it seems likely, forms a metamorphic layer which shows fragile strength in the segment. Therefore, we can understand that it is preferable to focus an electron-beam as far from the Cu-Co layer as possible to prevent the degeneration or the weakening of the material of the segment.

Figure 1:
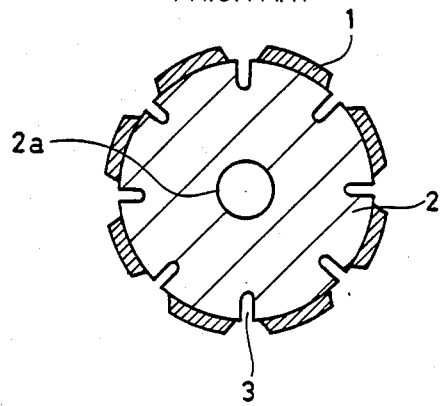
FIG. 1 shows a conventional brazing method for fixing segments.
Figure 2:
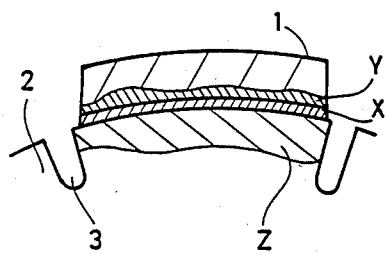
FIG. 2 explains the necessary conditions for the welding of the segment to a core.

Furthermore the 33% Cu-67% Co sintered powder compact is considered to be more likely to generate a metamorphosis of the material due to welding heat, because of the higher Cu content compared with the 15% Cu-85% Co sintered powder compact, which relates to the problem of the Y-layer in FIG. 2. In the case of combination of a double layer segment having 33% Cu-67% Co and 100% Co layers, 100% Ni sheet filler and SPCC core, samples of double layer segments having 0.5, 1 and 2 mm thick Co layers were prepared. The thickness of the Ni-filler was 0.2 mm.

An electron beam was focused on the center line of the Ni-filler and welding was performed. The welding strength is shown in the following table.

| Thickness of Co base layer (mm) | Torque strength (kg · cm) | Remarks |
|---|---|---|
| 0.5 | 60, 60, 60, 60 | All broken at segment layer |
| 1 | 60, 60, 60, 60 | None broken, but all bent |
| 2 | 60, 70, 70, 60 | None broken, but all bent |

From this, we can say that a Co base layer of at least 1 mm thickness prevents 33% Co-67% Co sintered powder compact from becoming degenerated due to welding heat.

Thus it can be understood that the double layer structure of segments having a Co base layer is effective.

Datum 10

An S50C in JIS core having no slot (the dimensions of which are the same as specified above) and a pure Co bond segment with Ni-filler in-between, were welded by an electron-beam. No breakage was observed under less than 120 kg.cm torque and 130 kg.cm torque bent the core. Thus it can be said the welding strength is sufficiently high.

Datum 11

Eight arc-shaped segments, which were made of sintered (Co-Cu) powder with diamond grit, and whose dimensions were 2.0 mm thickness and 32 mm length, were brazed with ordinary solder on an SPCC (mild steel) circular disc whose dimensions were 92 mm outer diameter, 20 mm inner diameter and 1.5 mm thickness, by the use of a high frequency electric device. Distortion took place on the SPCC disc. The run-out of the distorted disc was measured at 70 mm diameter. The run-out fluctuated from +0.05 to −0.10 mm. This means the total distortion produced was 0.15 mm. Such a disc of 0.15 mm distortion cannot be employed in actual use at all.

By contrast, distortion for a core of the same material and of the same dimensions to which the same segments were welded by an electron beam remained within ±0.01 mm. It was also confirmed that distortion in a core of SK-5 or S50C (carbon steel) was hardly observed at all.

In addition, it was confirmed that cutters composed of similar segments comprising CBN grit instead of diamond grit yield the same effects in the same manner.

The above-mentioned -method for welding cutter segments with an electron-beams can be summarized as below:

(a) As was described above, a mixture of a super-abrasive such as diamond or CBN grit, and bond powder such as Co is compacted and sintered (in most cases, hot-pressed) to a nearly 100% density to produce segments of bond matrix containing diamond or CBN grit as the dispersoid. Difficult-to-quench steel such as low-carbon steel is used as the core. The circular cutter made with this combination of materials can be safely applied for use where a large bending stress is not inflicted on the core.

(b) For use where a large bending stress is inflicted on the core, resulting in the possibility of warping of the core, the following combination is applied: (b-1) segments made of Co bond powder compact sintered to nearly 100% apparent density, (b-2) a core made of high carbon-steel such as SK-5, (b-3) Ni sheet fillers inserted between segments and core for welding and (b-4) tempering at 350°–450° C.

Figure 5:
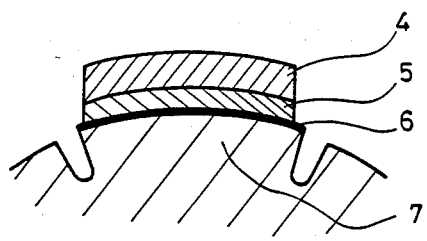
FIG. 5 shows a part of a cutter embodying this invention.

(c) In the case where a bond material other than pure Co is necessary, for example, to the performance of a handy cutter, a double layer segment (with, in the case shown in FIG. 5, a (Cu+Co) bond powder layer 4 and Co powder layer 5 without diamond grit), a 100% Ni-filler 6 and a core 7 made of SPCC are used.

Figure 6:
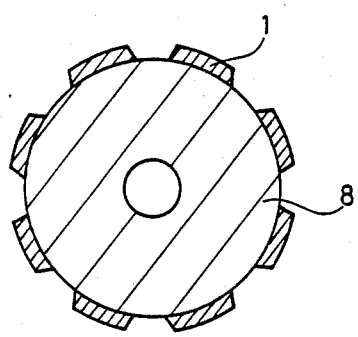
FIG. 6 shows another embodiment of this invention.

(d) A core without slot is used. FIG. 6 shows a circular disc core 8 without a slot.

This invention is most suited to the segmented cutter blades mounted on handy or wagon-type portable machines which are used in cutting or working stones, concrete and slate.

Although the present invention has been described and illustrated in detail, it is clearly understood that the same is by way of illustration and example only and is not to be taken by way of limitation, the scope of the present invention being limited only by the terms of the appended claims.

What is claimed is:

1. In a method for fixing to a steel core body a segment containing grit selected from the group consisting of diamond, cubic boron nitride and mixtures thereof, the improvement comprising the steps of using as the material of said segment, a cobalt powder compact, containing said grit, which has been sintered to nearly 100% apparent density, and welding said segment to said steel core body by focusing an electron beam or a laser beam on the boundary between said steel core body and said segment.

2. The method according to claim 1, wherein said steel core body is formed of low carbon steel.

3. The method according to claim 1, wherein said steel core body is formed of high carbon steel.

4. The method according to claim 3, wherein said boundary has nickel filler.

5. The method according to claim 3, further comprising the step of tempering said steel core body after said welding step.

6. The method according to claim 5, wherein said tempering step is carried out at temperatures of 350°–450° C.

7. In a method for fixing to a steel core body a segment containing grit selected from the group consisting of diamond, cubic boron nitride and mixtures thereof, the improvement comprising the steps of using a double layer segment, one layer of which is composed of a powder compact, containing said grit, which has been sintered to nearly 100% apparent density, and the other layer of which is composed of a sintered cobalt powder compact without any grit and functions as the joining portion for the welding of said segment to said steel core body by focusing an electron beam or a laser beam on the boundary between said steel core body and said segment.

8. The method according to claim 7, wherein said steel core body is formed of low carbon steel.

9. The method according to claim 7, wherein said steel core body is formed of high carbon steel.

10. The method according to claim 9, wherein said boundary has nickel filler.

11. The method according to claim 9, further comprising the steps of tempering said steel core body after said welding step.

12. The method according to claim 11, wherein said tempering step is carried out at temperatures of 350°–450° C.

13. A cutter made by the method of claim 1.

14. A cutter made by the method of claim 7.

15. A method of making a cutter comprising the steps of:

(a) forming a plurality of segments, each of the segments comprising a cobalt powder compact containing grit selected from the group consisting of diamond, cubic boron nitride and mixtures thereof, the cobalt powder compact containing the grit being sintered to substantially 100% apparent density; and (b) welding each of the segments to a core body by focusing an electron beam or a laser beam on the boundary between the core body and the segment.

16. The method according to claim 15, further comprising the step of tempering the core body after said welding step (b).

17. The method according to claim 16, wherein said tempering step is carried out at temperatures of 350° C. to 450° C.

* * * * *